(12) United States Patent
Minamiyama et al.

(10) Patent No.: US 10,547,231 B2
(45) Date of Patent: Jan. 28, 2020

(54) ELECTRIC ROTATION DEVICE

(71) Applicant: AISIN SEIKI KABUSHIKI KAISHA, Kariya-shi (JP)

(72) Inventors: Hirotomo Minamiyama, Nagoya (JP); Sayaka Hara, Chiryu (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 135 days.

(21) Appl. No.: 15/860,111

(22) Filed: Jan. 2, 2018

(65) Prior Publication Data

US 2018/0219458 A1     Aug. 2, 2018

(30) Foreign Application Priority Data

Jan. 27, 2017   (JP) ................................. 2017-012955

(51) Int. Cl.
| | |
|---|---|
| *H02K 11/22* | (2016.01) |
| *A47K 13/10* | (2006.01) |
| *H02K 7/116* | (2006.01) |

(52) U.S. Cl.
CPC .............. *H02K 11/22* (2016.01); *A47K 13/10* (2013.01); *H02K 7/1166* (2013.01)

(58) Field of Classification Search
CPC .......... H02K 11/00; H02K 11/22; H02K 7/00; H02K 7/11; H02K 7/116; H02K 7/1166; A47K 13/00; A47K 13/10; A63F 7/02; B60H 1/00664; B62D 15/00; B62D 15/02; F16H 19/00; F16H 19/001; F16H 55/17; F16H 1/00; F16H 1/003; G04B 11/00; G04B 11/006; G01D 5/00; G01D 5/14; G01D 5/1455; G01B 7/00; G01B 7/30

See application file for complete search history.

(56) References Cited

U.S. PATENT DOCUMENTS

| | | | | |
|---|---|---|---|---|
| 4,223,528 A | * | 9/1980 | Vuilleumier | ............ F16H 1/003 368/220 |
| 2009/0312147 A1 | * | 12/2009 | Oshima | .................. B60K 28/10 477/110 |

(Continued)

FOREIGN PATENT DOCUMENTS

| | | |
|---|---|---|
| JP | 2010-246880 | 11/2010 |
| JP | 2011-69431 | 4/2011 |

*Primary Examiner* — Tran N Nguyen
(74) *Attorney, Agent, or Firm* — Oblon, McClelland, Maier & Neustadt, L.L.P.

(57) ABSTRACT

An electric rotation device rotating a rotation target member by torque outputted to an output member includes: a motor; a reduction gear mechanism including transmission gears transmitting torque from the motor to the output member; a rotational position detection gear including a tooth width different from that of a predetermined gear among the transmission gears, and meshing with the predetermined gear; a rotational position detection sensor outputting a signal corresponding to a rotational position of the rotational position detection gear, and detecting a rotational position of the rotation target member; a visual recognition portion configured to distinguish a reference tooth of one gear from the other tooth of the one gear; and a groove filling portion filling a tooth groove of the other gear, the groove filling portion filling a portion of the tooth groove not overlapping the one gear in a radial direction.

5 Claims, 9 Drawing Sheets

(56) References Cited

U.S. PATENT DOCUMENTS

2009/0322320 A1* 12/2009 Hatanaka ........... B62D 15/0215
324/207.25
2015/0285361 A1* 10/2015 Ikeda ................. B60H 1/00664
74/412 R

* cited by examiner

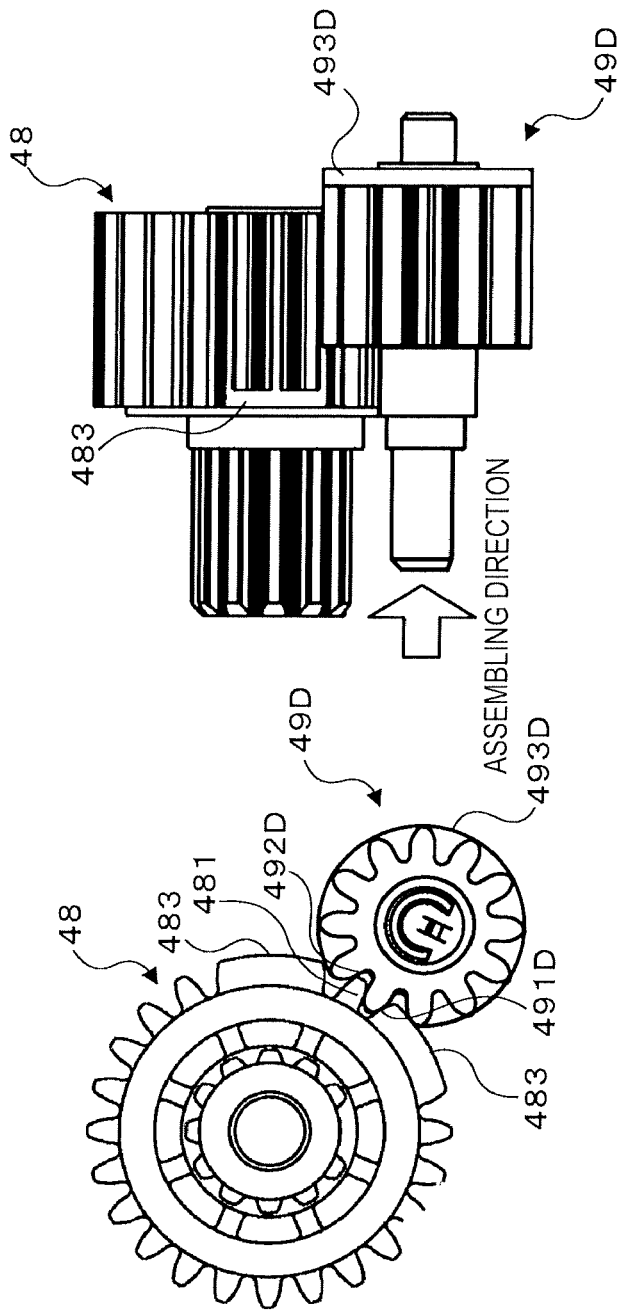

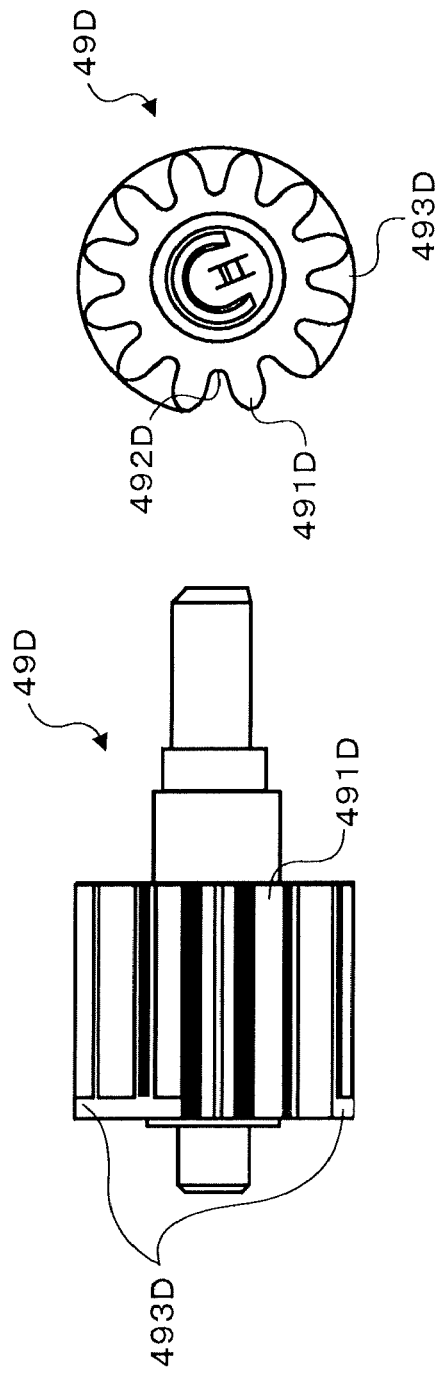

ELECTRIC ROTATION DEVICE

CROSS REFERENCE TO RELATED APPLICATIONS

This application is based on and claims priority under 35 U.S.C. § 119 to Japanese Patent Application 2017-012955, filed on Jan. 27, 2017, the entire contents of which are incorporated herein by reference.

TECHNICAL FIELD

This disclosure relates to an electric rotation device that rotates a rotation target member by torque output to an output member.

BACKGROUND DISCUSSION

In the related art, as a type of an electric rotation device, there has been proposed a device including a motor and a reduction gear mechanism that reduces a rotation of the motor and transmits the rotation to a rotation shaft of a toilet seat (toilet lid) (for example, refer to JP 2010-246880A (Reference 1)).

In such an electric rotation device, in order to detect the opening and closing position of a toilet seat (toilet lid), there is a case where a rotational position sensor (for example, rotary potentiometer, rotary encoder, and the like) that meshes a rotational position detection gear with a transmission gear of a reduction gear mechanism and outputs a signal corresponding to a rotational position of a rotational position detection gear is provided. In this case, since the tooth serving as a reference of a meshing position with respect to the transmission gear is determined for the rotational position detection gear, it is required to prevent erroneous assembly from occurring when an operator assembles the rotational position detection gear in an assembling step.

Thus, a need exists for an electric rotation device which is not susceptible to the drawback mentioned above.

SUMMARY

A gist of an electric rotation device according to a first aspect of this disclosure resides in that the electric rotation device rotates a rotation target member by torque outputted to an output member, and includes a motor, a reduction gear mechanism including plural transmission gears that transmit torque from the motor to the output member, a rotational position detection gear including a tooth width different from a tooth width of a predetermined gear among the plurality of transmission gears, the rotational position detection gear meshing with the predetermined gear at a specified meshing position, wherein one of the rotational position detection gear and the predetermined gear corresponds to one gear, and the other of the rotational position detection gear and the predetermined gear corresponds to the other gear, the electric rotation device includes a rotational position detection sensor that outputs a signal corresponding to a rotational position of the rotational position detection gear, and detects a rotational position of the rotation target member, a visual recognition portion configured to distinguish a reference tooth of the one gear from the other tooth of the one gear such that the reference tooth of the one gear is visually recognized, the reference tooth of the one gear serving as a reference of a meshing position of the one gear with respect to the other gear, and a groove filling portion filling a tooth groove of surrounding teeth with respect to a reference tooth of the other gear, the reference tooth of the other gear configured to mesh with the reference tooth of the one gear, the groove filling portion filling a portion of the tooth groove, the portion which does not overlap the one gear in a radial direction.

A gist of an electric rotation device according to a second aspect of this disclosure resides in that the electric rotation device rotates a rotation target member by torque outputted to an output member, and includes a motor, a reduction gear mechanism including plural transmission gears that transmit torque from the motor to the output member, a rotational position detection gear that meshes with a predetermined gear among the plurality of transmission gears at a specified meshing position at which the rotational position detection gear and the predetermined gear are deviated from each other in an axial direction, wherein one of the rotational position detection gear and the predetermined gear corresponds to one gear, and the other of the rotational position detection gear and the predetermined gear corresponds to the other gear, the electric rotation device includes a rotational position detection sensor that outputs a signal corresponding to a rotational position of the rotational position detection gear, and detects a rotational position of the rotation target member, a first groove filling portion filling a tooth groove of surrounding teeth with respect to a reference tooth of the one gear, the reference tooth of the one gear serving as a reference of a meshing position of the one gear with respect to the other gear, the first groove filling portion filling a portion of the tooth groove, the portion which does not overlap the other gear in a radial direction, and a second groove filling portion filling a tooth groove of surrounding teeth with respect to a reference tooth of the other gear, the reference tooth of the other gear configured to mesh with the reference tooth of the one gear, the second groove filling portion filling a portion of the tooth groove, the portion which does not overlap the one gear in the radial direction.

BRIEF DESCRIPTION OF THE DRAWINGS

The foregoing and additional features and characteristics of this disclosure will become more apparent from the following detailed description considered with the reference to the accompanying drawings, wherein:

FIG. 9A is a front view of the output gear and a rotational position detection gear according to a second embodiment meshed with each other;

FIG. 9B is a side view of the output gear and the rotational position detection gear according to the second embodiment meshed with each other;

FIG. 10A is a front view of the rotational position detection gear according to the second embodiment; and FIG. 10B is a side view of the rotational position detection gear according to the second embodiment.

DETAILED DESCRIPTION

Embodiments

Embodiments for performing this disclosure will be described with reference to examples.

First Embodiment

Figure 1:
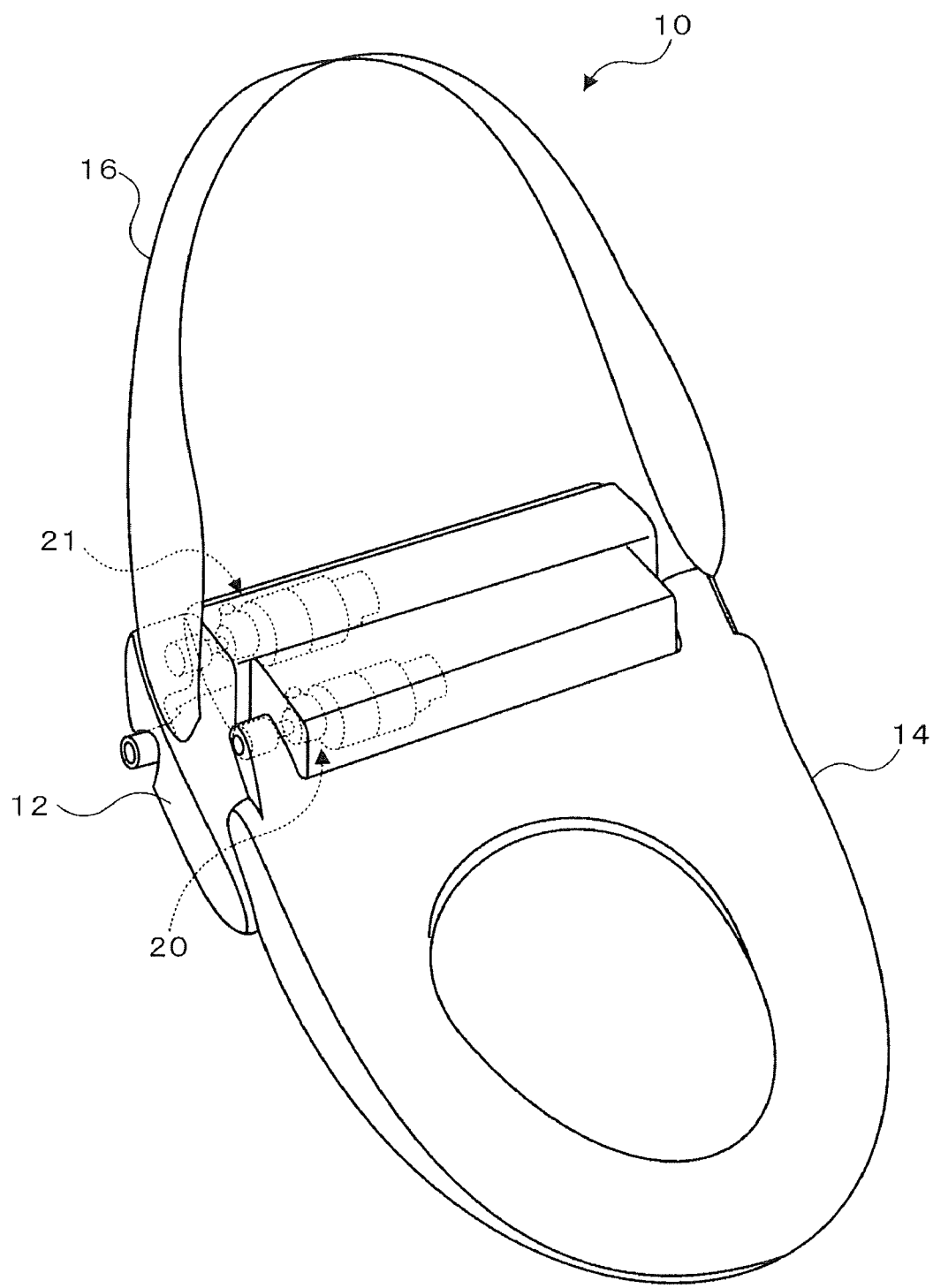
FIG. 1 is a schematic diagram illustrating a configuration of a toilet seat device having an electric rotation device according to one embodiment disclosed here.
Figure 2:
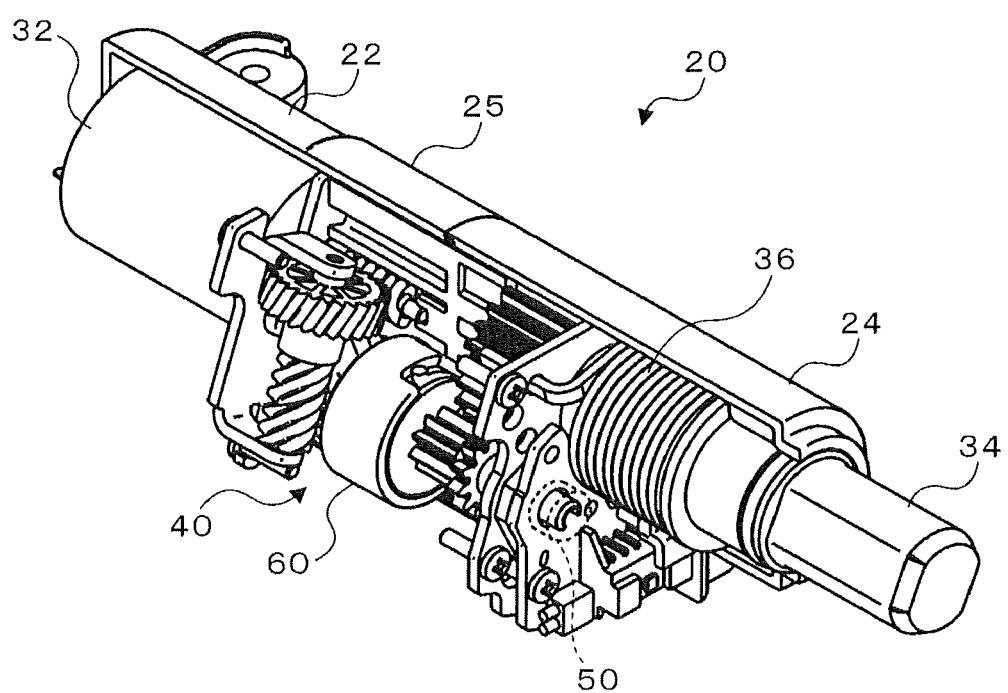
FIG. 2 is a schematic diagram illustrating a configuration of the electric rotation device.
Figure 3:
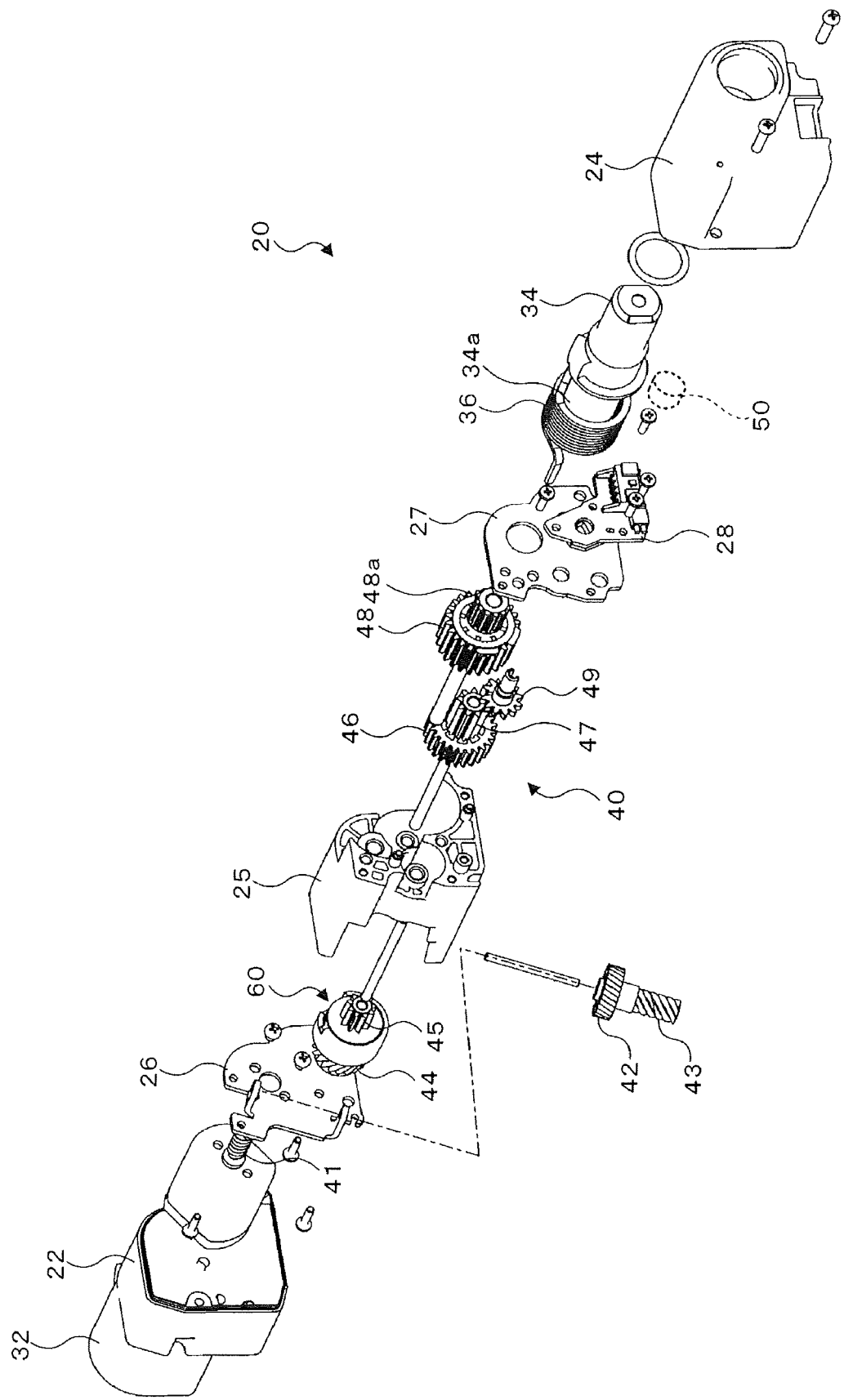
FIG. 3 is an exploded perspective view illustrating the electric rotation device in an exploded manner.

FIG. 1 is a schematic diagram illustrating a configuration of a toilet seat device 10 having an electric rotation device 20 according to one embodiment disclosed here. FIG. 2 is a schematic diagram illustrating a configuration of the electric rotation device 20. FIG. 3 is an exploded perspective view illustrating the electric rotation device 20 in an exploded manner. The toilet seat device 10 is installed on an upper surface of a toilet bowl and is configured as a warm water washing toilet seat device that can clean a private part of a user sitting on a toilet seat 14 with washing water sprayed from a nozzle. As illustrated in FIG. 1, the toilet seat device 10 is provided with a main body 12 installed behind the upper surface of the toilet bowl, the toilet seat 14 and a toilet lid 16 supported to be openable and closable with respect to the main body 12, and electric rotation devices 20 and 21 built in the main body 12 for opening and closing the toilet seat 14 and the toilet lid 16, respectively. Hereinafter, the details of the electric rotation device 20 will be described. The electric rotation device 21 is configured similarly to the electric rotation device 20, so that the detailed description will be omitted.

As illustrated in FIGS. 2 and 3, the electric rotation device 20 is provided with a motor 32, an output shaft 34, a reduction gear mechanism 40, a rotational position sensor 50, a torque limiter 60, a first housing 22 that houses the motor 32, a second housing 24 that houses a portion of the output shaft 34 and a portion of the reduction gear mechanism 40, and a bracket 25 that is provided between the first and second housings 22 and 24.

The output shaft 34 is fitted to the rotating portion of the toilet seat 14 so as to be relatively non-rotatable, and opens and closes the toilet seat 14 with rotation. In addition, as illustrated in FIGS. 2 and 3, the output shaft 34 is provided with an assist spring 36 for urging the toilet seat 14 in an opening direction.

As illustrated in FIG. 3, the reduction gear mechanism 40 is provided with a first worm 41 coaxially connected so as to rotate integrally with a rotating shaft of the motor 32, a first worm wheel 42 meshed with the first worm 41, a second worm 43 coaxially connected so as to rotate integrally with the first worm wheel 42, a second worm wheel 44 meshed with the second worm 43, a first small diameter gear 45 of a spur tooth coaxially connected so as to rotate integrally with the second worm wheel 44, a first large diameter gear 46 of a spur tooth meshed with the first small diameter gear 45, a second small diameter gear 47 coaxially connected so as to rotate integrally with the first large diameter gear 46, and a large diameter output gear 48 of a spur tooth meshed with the second small diameter gear 47. In the output gear 48, a cylindrical connecting portion 48a having a spline on the outer peripheral surface extends in the axial direction, and an outer peripheral surface of the connecting portion 48a is spline-fitted to an inner peripheral surface of a cylindrical connecting portion 34a provided at the end portion of the output shaft 34. As a result, the torque from the motor 32 is transmitted to the output shaft 34 through deceleration by the first worm 41 and the first worm wheel 42 meshing with each other, deceleration by the second worm 43 and the second worm wheel 44 meshing with each other, deceleration by the first small diameter gear 45 and the first large diameter gear 46 meshing with each other, and deceleration by the second small diameter gear 47 and the output gear 48 meshing with each other, so that the toilet seat 14 is opened and closed.

The first worm wheel 42 and the second worm 43 are integrally formed with a resin material, and are rotatably supported by a support plate 26. The second worm wheel 44 and the first small diameter gear 45 are respectively molded with a resin material, connected via the torque limiter 60, and are rotatably supported by the bracket 25 and the support plate 26. The first large diameter gear 46 and the second small diameter gear 47 are integrally formed with a resin material, and are rotatably supported by the bracket 25 and a second support plate 27. The output gear 48 is formed with a resin material, and is rotatably supported by the bracket 25 and the second support plate 27.

In addition, a rotational position detection gear 49 formed with a resin material is meshed with the output gear 48, and the rotational position sensor 50 for outputting a signal corresponding to the rotational position is provided on the rotational position detection gear 49. The rotational position sensor 50 is supported by the second support plate 27 via an attachment plate 28. For the rotational position sensor 50, for example, a rotary potentiometer, a rotary encoder or the like can be adopted.

After assembling the output gear 48, the rotational position detection gear 49 is assembled so as to mesh with the output gear 48. A tooth serving as a reference of a meshing position with respect to the output gear 48 is determined in the rotational position detection gear 49. When the meshing position with respect to the output gear 48 is deviated in a circumferential direction, the rotational position sensor 50 cannot detect the correct rotational position of the output gear 48 (output shaft 34).

Figure 4A:
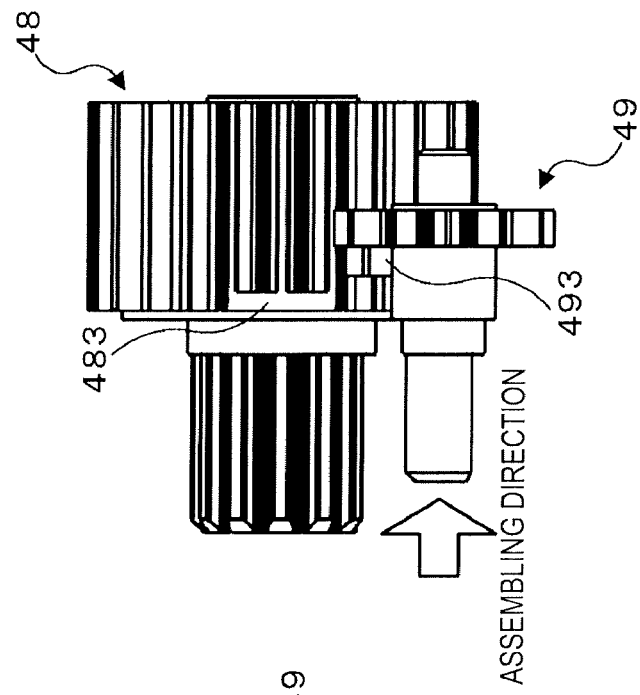
FIG. 4A is a front view of an output gear and a rotational position detection gear meshed with each other.
Figure 4B:
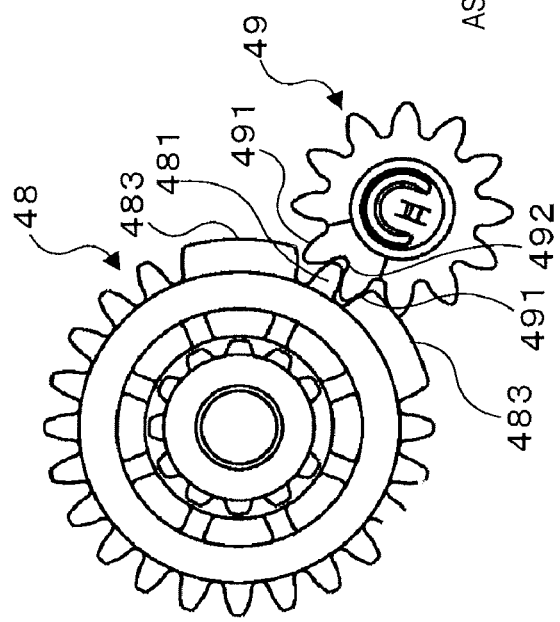
FIG. 4B is a side view of the output gear and the rotational position detection gear meshed with each other.
Figure 5A:
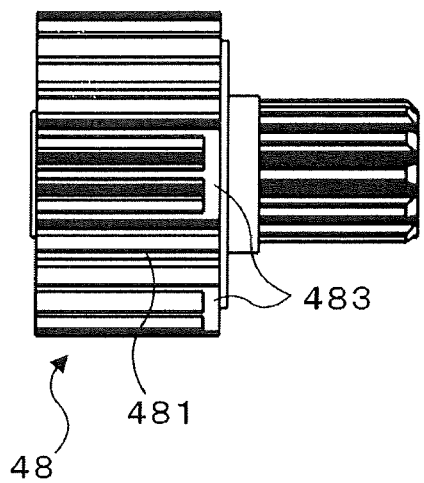
FIG. 5A is a front view of the output gear.
Figure 5B:
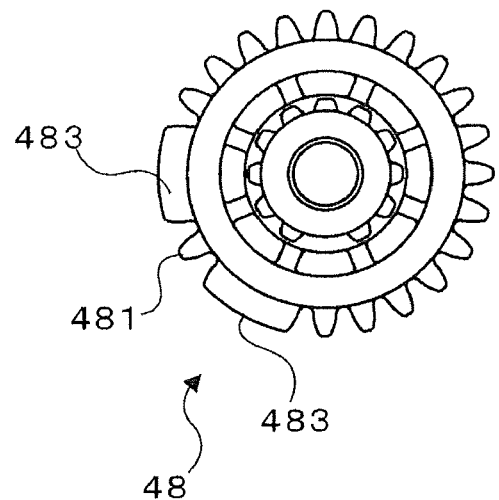
FIG. 5B is a side view of the output gear.
Figure 6A:
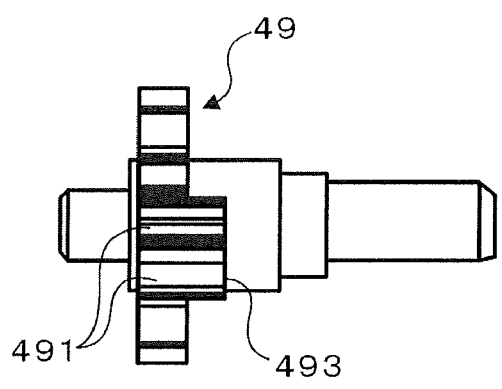
FIG. 6A is a front view of the rotational position detection gear.
Figure 6B:
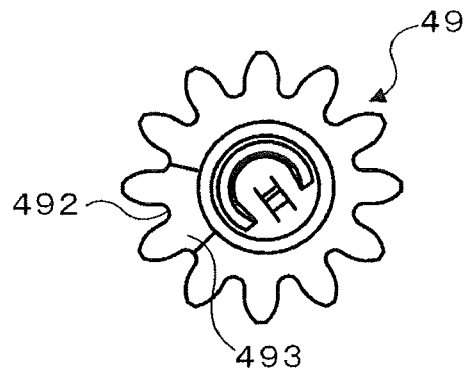
FIG. 6B is a side view of the rotational position detection gear.

FIG. 4 is a front view and a side view of the output gear 48 and the rotational position detection gear 49 meshed with each other. FIG. 5 is a front view and a side view of the output gear 48. FIG. 6 is a front view and a side view of the rotational position detection gear 49. As illustrated in FIGS. 4 and 6, in the rotational position detection gear 49, a projecting portion 493 extending in a tooth width direction is formed along a tooth profile from the end surface of two teeth (reference teeth) 491 serving as references for the meshing position with respect to the output gear 48, and the tooth width including the projecting portion 493 is formed to be shorter than the output gear 48. As illustrated in FIGS. 4 and 5, the output gear 48 is formed with a groove filling portion 483 that fills each tooth groove interposed between three (plurality of) teeth on each side in the circumferential direction with respect to one tooth (reference tooth) 481 meshing with a tooth groove 492 interposed between the two teeth (reference teeth) 491 of the rotational position detection gear 49. As illustrated in FIG. 4, in order to enable rotation of the output gear 48 and the rotational position detection gear 49 in a state of being meshed with each other, the groove filling portion 483 is formed so as to fill only the portion not overlapping with the teeth and the projecting portion 493 of the rotational position detection gear 49 in the radial direction (end portion on the assembly side of the rotational position detection gear 49). As a result, when assembling the rotational position detection gear 49 to the output gear 48, it is only required for the operator to assemble the rotational position detection gear 49 to the output gear 48 so that the tooth groove 492 of the two teeth 491 on which the projecting portion 493 of the rotational position detection gear 49 is formed mesh with the one tooth 481 interposed between the groove filling portion 483 of the output gear 48, so that erroneous assembly can be suppressed.

In the electric rotation device 20 of the first embodiment described above, the projecting portions 493 that extend in the tooth width direction from the end surfaces of the two teeth 491 are provided so that the two teeth (reference teeth) 491 serving as a reference of the meshing position of the rotational position detection gear 49 meshing with the output gear 48 can be visually recognized by distinguishing the two teeth (reference teeth) 491 from the other teeth of the rotational position detection gear 49, and the groove filling portion 483 that fills each tooth groove of the teeth on surrounding both sides with respect to one tooth (reference tooth) 481 of the output gear 48 meshed with the tooth groove 492 interposed between the two teeth (reference teeth) 491 of the rotational position detection gear 49 is provided. The groove filling portion 483 is provided so as to fill only the portion not overlapping with the teeth and the projecting portion 493 of the rotational position detection gear 49 in the radial direction. As a result, it is only required for the operator to assemble both so that the tooth groove 492 of two teeth (reference teeth) 491 on which the projecting portion 493 of the rotational position detection gear 49 is formed meshes with one tooth (reference tooth) 481 interposed between the groove filling portions 483 of the output gear 48, so that erroneous assembly can be suppressed.

Figure 7A:
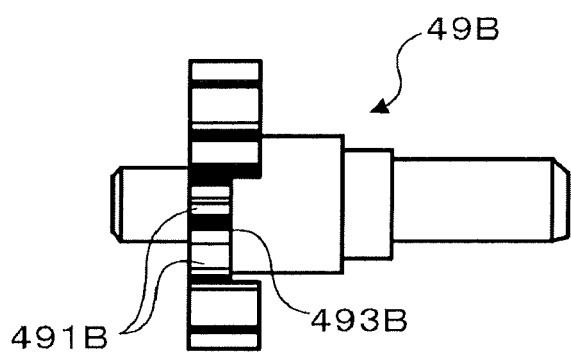
FIG. 7A is a front view of a rotational position detection gear according to a modified example.
Figure 7B:
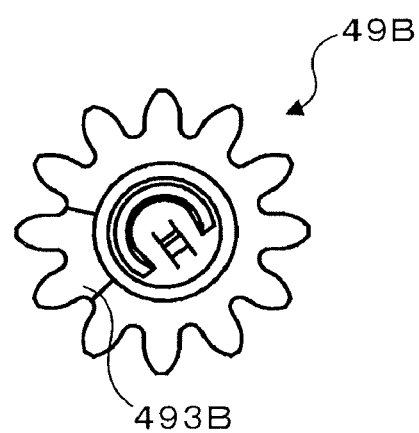
FIG. 7B is a side view of the rotational position detection gear according to the modified example.
Figure 8A:
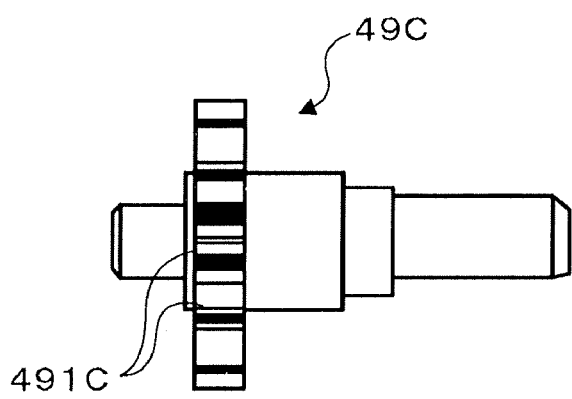
FIG. 8A is a front view of a rotational position detection gear according to the modified example.
Figure 8B:
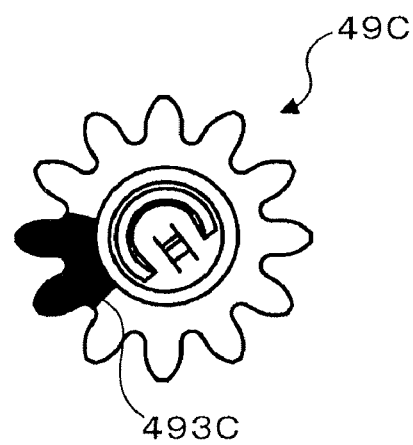
FIG. 8B is a side view of the rotational position detection gear according to the modified example.

In the first embodiment, the projecting portion 493 extending in the tooth width direction along the tooth profile from the end surface of the two teeth (reference teeth) 491 serving as the reference of the meshing position with respect to the output gear 48 is formed in the rotational position detection gear 49, but it is not limited thereto. As illustrated in a rotational position detection gear 49B of the modified example of FIG. 7, a recessed portion 493B may be formed in which the end surface of the two teeth (reference teeth) 491B serving as the reference of the meshing position with respect to the output gear 48 is recessed in the tooth width direction from the other tooth. As illustrated in a rotational position detection gear 49C of the modification of FIG. 8, a colored portion 493C may be formed in which the end surfaces of two teeth (reference teeth) 491C serving as the reference of the meshing position with respect to the output gear 48 are colored in a color different from that of the end surface of the other tooth. In this manner, any device may be used as long as the operator can visually recognize the two teeth of the rotational position detection gear serving as the reference of the meshing position, so as to be distinguished from the other teeth.

In the first embodiment, the projecting portion 493 (visual recognition portion) is provided on the rotational position detection gear 49 and the groove filling portion 483 is provided in the output gear 48, but a groove filling portion may be provided in the rotational position detection gear 49 and a visual recognition portion may be provided in the output gear 48.

Second Embodiment

The electric rotation device of the second embodiment is configured to be provided with a groove filling portion (second groove filling portion 493D) instead of the projecting portion (visual recognition portion) in a rotational position detection gear 49D. FIG. 9 is a front view and a side view of the output gear 48 and the rotational position detection gear 49D according to a second embodiment meshed with each other. FIG. 10 is a front view and a side view of the rotational position detection gear 49D according to the second embodiment. As illustrated in FIGS. 9 and 10, in the rotational position detection gear 49D of the second embodiment, the second groove filling portion 493D filling the tooth grooves of entire surrounding teeth is formed for one tooth (reference tooth) 491D serving as the reference of the meshing position with respect to the output gear 48. As illustrated in FIG. 9, in the output gear 48, a groove filling portion 483 for filling each tooth groove interposed between three (plural) teeth on both sides in the circumferential direction is formed with respect to one tooth (reference tooth) 481 meshing with one tooth groove 492D of one tooth (reference tooth) 491D of the rotational position detection gear 49D. In order to enable rotation of the output gear 48 and the rotational position detection gear 49D in a state of being engaged with each other, the output gear 48 and the rotational position detection gear 49D mesh with each other at position where the output gear 48 and the rotational position detection gear 49D are deviated or displaced from each other in the axial direction, the groove filling portion 483 of the output gear 48 is formed in a portion which does not overlap the teeth of the rotational position detection gear 49D in the radial direction, and the second groove filling portion 493D of the rotational position detection gear 49D is formed in a portion which does not overlap the teeth of the output gear 48 in the radial direction. As a result, since it is difficult for the operator to mesh the rotational position detection gear 49 with respect to the output gear 48 at a position other than the specified meshing position by the groove filling portion 483 and the second groove filling portion 493D, the erroneous assembly can be effectively suppressed. Although the second groove filling portion 493D fills the tooth grooves of entire surrounding teeth with respect to one tooth (reference tooth) 491D serving as the reference of the meshing position, the second groove filling portion 493D may fill the tooth grooves of a plurality of teeth including at least the teeth on both sides in circumferential direction.

In the second embodiment, the groove filling portion 483 is provided in the output gear 48 and the second groove filling portion 493D is provided in the rotational position detection gear 49D, but the second groove filling portion may be provided in the output gear 48 and the groove filling portion may be provided in the rotational position detection gear 49D.

In the first embodiment and the second embodiment, this disclosure is applied to the device in which the rotational position detection gears 49 and 49D are meshed with the output gear 48, but may be applied to a device in which the rotational position detection gear is meshed with another gear provided in the reduction gear mechanism 40.

In the embodiment, this disclosure is applied to the electric rotation device 20 for opening and closing the toilet seat 14, but it may be applied to the toilet lid opening and closing device 21 which opens and closes the toilet lid 16, and it may be applied to the rotation of any other rotation target member other than the toilet seat 14 and the toilet lid 16.

The correspondence relation between the main elements of the embodiment and the main elements disclosed here described in the section of Summary will be described. In the embodiment, the motor 32 corresponds to "motor", the reduction gear mechanism 40 corresponds to "reduction gear mechanism", the rotational position detection gears 49, 49B, and 49C correspond to the "rotational position detection gear", the projecting portion 493, the recessed portion 493B, and the colored portion 493C correspond to the "visual recognition portion", and the groove filling portion 483 corresponds to the "groove filling portion". In addition, the rotational position detection gear 49D corresponds to "rotational position detection gear", the groove filling portion 483 corresponds to "first groove filling portion", and the second groove filling portion 493D corresponds to "second groove filling portion".

Since the embodiment is an example for specifically describing the aspect for performing this disclosure described in the section of Summary in the embodiment, the correspondence relation between the main elements of the embodiment and the main elements disclosed here described in the section of Summary does not limit elements disclosed here described in the section of Summary. That is, the interpretation of this disclosure described in the section of Summary should be made based on the description in the section, and the embodiment is merely a specific example disclosed here described in the section of Summary.

Hereinbefore, although the aspect for performing this disclosure has been described with reference to the embodiment, this disclosure is not limited to these embodiments at all, and it goes without saying that this disclosure can be implemented in various aspects without departing from the gist disclosed here.

This disclosure can be used in the manufacturing industry of the electric rotation device and the like.

A gist of an electric rotation device according to a first aspect of this disclosure resides in that the electric rotation device rotates a rotation target member by torque outputted to an output member, and includes a motor, a reduction gear mechanism including plural transmission gears that transmit torque from the motor to the output member, a rotational position detection gear including a tooth width different from a tooth width of a predetermined gear among the plurality of transmission gears, the rotational position detection gear meshing with the predetermined gear at a specified meshing position, wherein one of the rotational position detection gear and the predetermined gear corresponds to one gear, and the other of the rotational position detection gear and the predetermined gear corresponds to the other gear. The electric rotation device includes a rotational position detection sensor that outputs a signal corresponding to a rotational position of the rotational position detection gear, and detects a rotational position of the rotation target member, a visual recognition portion (for example, the projection portion, the recessed portion, the colored portion) configured to distinguish a reference tooth of the one gear from the other tooth of the one gear such that the reference tooth of the one gear is visually recognized, the reference tooth of the one gear serving as a reference of a meshing position of the one gear with respect to the other gear, and a groove filling portion filling a tooth groove of surrounding teeth with respect to a reference tooth of the other gear, the reference tooth of the other gear configured to mesh with the reference tooth of the one gear, the groove filling portion filling a portion of the tooth groove, the portion which does not overlap the one gear in a radial direction.

In the electric rotation device according to the first aspect of this disclosure, in a device provided with the rotational position detection gear having a tooth width different from a tooth width of a predetermined gear among the plurality of transmission gears and meshing at a specified meshing position, the visual recognition portion for distinguishing a reference tooth serving as a reference of a meshing position of one gear with respect to the other gear among the predetermined gear and the rotational position detection gear from the other teeth so as to visually recognizes the reference tooth, and the groove filling portion that fills the tooth groove of the surrounding teeth with respect to the reference tooth of the other gear meshing with the two teeth of one gear are provided. The groove filling portion is provided so as to fill a portion not overlapping with the one gear in the radial direction of the other gear. As a result, since it is only required for the operator to assemble both so that the reference tooth of the one gear that is visually recognized at the visual recognition portion and the reference tooth of the other gear interposed by the groove filling portions are meshed with each other, the erroneous assembly can be suppressed. Here, the predetermined gear may be an output gear connected to the output member.

In the electric rotation device according to the first aspect of this disclosure, the visual recognition portion may be a projecting portion that extends from an end surface of the reference tooth of the one gear in a tooth width direction, and the visual recognition portion may be a recessed portion in which the end surface of the reference tooth of the one gear is recessed in the tooth width direction. The visual recognition portion may be a colored portion in which an end surface of the reference tooth of the one gear is colored in a color different from that of an end surface of the other tooth of the one gear. In this manner, with a simple configuration, it is possible for the operator to visually recognize the reference tooth of one gear from the other tooth.

In the electric rotation device according to this disclosure, the predetermined gear may be an output gear that is connected to the output member.

A gist of an electric rotation device according to a second aspect of this disclosure resides in that the electric rotation device rotates a rotation target member by torque outputted to an output member, and includes a motor, a reduction gear mechanism including plural transmission gears that transmit torque from the motor to the output member a rotational position detection gear that meshes with a predetermined gear among the plurality of transmission gears at a specified meshing position at which the rotational position detection gear and the predetermined gear are deviated from each other in an axial direction, wherein one of the rotational position detection gear and the predetermined gear corresponds to one gear, and the other of the rotational position detection gear and the predetermined gear corresponds to the other gear. The electric rotation device includes a rotational position detection sensor that outputs a signal corresponding to a rotational position of the rotational position detection gear, and detects a rotational position of the rotation target member, a first groove filling portion filling a tooth groove of surrounding teeth with respect to a reference tooth of the one gear, the reference tooth of the one gear serving as a reference of a meshing position of the one gear with respect to the other gear, the first groove filling portion filling a portion of the tooth groove, the portion which does not overlap the other gear in a radial direction, and a second groove filling portion filling a tooth groove of surrounding teeth with respect to a reference tooth of the other gear, the reference tooth of the other gear configured to mesh with the reference tooth of the one gear, the second groove filling portion filling a portion of the tooth groove, the portion which does not overlap the one gear in the radial direction.

In the electric rotation device according to the second aspect of this disclosure, in a device provided with the rotational position detection gear meshing with a predetermined gear from the plurality of transmission gears at a specified meshing position where the rotational position detection gear and the predetermined gear are deviated from each other in the axial direction, the first groove filling portion which fills the tooth groove of the surrounding teeth with respect to the reference tooth serving as the reference of the meshing position of the one gear of the predetermined gear and the rotational position detection gear with respect to the other gear, and the second groove filling portion which fills the tooth groove of the surrounding teeth with respect to one tooth of the other gear meshing with the two teeth of the one gear are provided. The first groove filling portion is provided so as to fill a portion not overlapping the other gear in the radial direction of one gear, and the second groove filling portion is provided so as to fill a portion not overlapping with the one gear in the radial direction of the other gear. As a result, since it is difficult for the operator to mesh the predetermined gear with the rotational position detection gear at a position other than the specified meshing position by the first groove filling portion and the second groove filling portion, the erroneous assembly can be effectively suppressed.

The principles, preferred embodiments and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. An electric rotation device that rotates a rotation target member by torque outputted to an output member, the device comprising:

a motor;

a reduction gear mechanism including a plurality of transmission gears that transmit torque from the motor to the output member;

a rotational position detection gear including a tooth width different from a tooth width of a predetermined gear among the plurality of transmission gears, the rotational position detection gear meshing with the predetermined gear at a predetermined meshing position, wherein one of the rotational position detection gear and the predetermined gear corresponds to one gear, and the other of the rotational position detection gear and the predetermined gear corresponds to the other gear;

a rotational position detection sensor that outputs a signal corresponding to a rotational position of the rotational position detection gear, and detects a rotational position of the rotation target member;

a visual recognition portion configured to distinguish a reference tooth of the one gear from the other tooth of the one gear such that the reference tooth of the one gear is visually recognized, the reference tooth of the one gear serving as a reference of a meshing position of the one gear with respect to the other gear; and a groove filling portion filling a tooth groove of surrounding teeth with respect to a reference tooth of the other gear, the reference tooth of the other gear configured to mesh with the reference tooth of the one gear, the groove filling portion filling a portion of the tooth groove, the portion which does not overlap the one gear in a radial direction.

2. The electric rotation device according to claim 1, wherein the visual recognition portion is a projecting portion that extends from an end surface of the reference tooth of the one gear in a tooth width direction.

3. The electric rotation device according to claim 1, wherein the visual recognition portion is a recessed portion in which an end surface of the reference tooth of the one gear is recessed in a tooth width direction.

4. The electric rotation device according to claim 1, wherein the visual recognition portion is a colored portion in which an end surface of the reference tooth of the one gear is colored in a color different from that of an end surface of the other tooth of the one gear.

5. The electric rotation device according to claim 1, wherein the predetermined gear is an output gear that is connected to the output member.

* * * * *